United States Patent [19]

Komatsu

[11] Patent Number: 4,953,416

[45] Date of Patent: Sep. 4, 1990

[54] POWER STEERING VALVE WITH TWO SPOOLS OF DIFFERENT SIZE TO COMPENSATE UNBALANCED CYLINDER

[75] Inventor: Koichi Komatsu, Atsugi, Japan

[73] Assignee: Atsugi Motor Parts Company Limited, Atsugi, Japan

[21] Appl. No.: 767,330

[22] Filed: Aug. 21, 1985

[51] Int. Cl.$^5$ ............................................. B62D 5/08
[52] U.S. Cl. ................................ 74/388 PS; 91/375 A; 91/431; 180/132
[58] Field of Search ...................... 91/165, 166, 375 R, 91/375 A, 382, 431, 415, 463; 180/132; 74/388 PS

[56] References Cited

U.S. PATENT DOCUMENTS

| | | | |
|---|---|---|---|
| 3,553,966 | 1/1971 | Liebert | 91/375 R X |
| 3,772,962 | 11/1973 | Suzuki | 91/375 A X |
| 4,696,198 | 9/1987 | Komatsu | 74/388 PS |

FOREIGN PATENT DOCUMENTS

| | | | |
|---|---|---|---|
| 1480666 | 10/1960 | Fed. Rep. of Germany | 180/132 |
| 1920826 | 11/1970 | Fed. Rep. of Germany | 91/375 A |
| 1924032 | 7/1980 | Fed. Rep. of Germany | 180/132 |
| 2931139 | 5/1981 | Fed. Rep. of Germany | . |
| 55-136658 | 10/1980 | Japan | 180/132 |
| 975518 | 11/1964 | United Kingdom | 91/375 A |

OTHER PUBLICATIONS

*Industrial Hydraulic Technology*, Bulletin 0221-B1, Parker -Hannifin Corp., Cleveland, Ohio, May 1985, pp. 8-3.

Primary Examiner—Edward K. Look
Assistant Examiner—George Kapsalas
Attorney, Agent, or Firm—Bachman & LaPointe

[57] ABSTRACT

A power-assist device for an automotive steering system employs spool valves with different external diameters to control the fluid pressure in smaller and larger area chambers of a pressure control valve which controls pressure in an unbalanced cylinder device. The different size of spool valves are disposed within different sizes of bores formed through a housing of the pressure control valve for defining wider fluid path area for introducing larger amount of working fluid into the smaller area chamber in comparison with that for the larger area chamber and narrower fluid path for draining the working fluid in the smaller area chamber for lower drainage rate in comparison with that for the larger area chamber.

9 Claims, 3 Drawing Sheets

POWER STEERING VALVE WITH TWO SPOOLS OF DIFFERENT SIZE TO COMPENSATE UNBALANCED CYLINDER

BACKGROUND OF THE INVENTION

The present invention relates generally to a power-assist device for an automotive steering system. More specifically, the invention relates to a power-assist device employing a spool valve-type pressure control valve.

Hydraulic power-assist devices employing unbalanced cylinder devices have been known to be of simple structure and low in cost. In such hydraulic power-assist devices, a piston firmly mounted on a piston rod is inserted into a hollow cylinder. The piston defines two pressure chambers within the hollow cylinder. The piston rod extends through one of the two pressure chambers, resulting in a difference between the effective areas of the piston subject to fluid pressure in the two pressure chambers. In particular, the pressure chamber receiving the piston rod will have a smaller effective area than the other chamber. The former pressure chamber will be referred to hereafter as "smaller area chamber" and the latter chamber will be referred to hereafter as "larger area chamber".

Due to this difference in the effective areas, when fluid pressure is applied equally to the smaller and larger area chambers, the hydraulic forces applied to the two sides of the piston to assist steering differ. As a result, the piston is displaced into the smaller area chamber until the forces applied to either side of the piston balance.

There are various approaches to solving this problem of the unbalanced cylinder device. One typical approach is disclosed in German Patent First Publication 29 31 139, published on Feb. 5, 1981. The disclosed device uses a pressure control valve employing spool valves to adjust the supply of working fluid to the smaller and larger diameter chambers. In the shown device, a spool valve controlling the supply of working fluid to the smaller area chamber has a relatively wide annular groove for relatively small throttling resistance to fluid flow. On the other hand, the other spool valve controlling the supply of working fluid to the larger area chamber has a relatively narrow annular groove applying a greater throttling resistance to fluid flow. Thus, the increasing rate of fluid pressure into the smaller area chamber is greater than that into the larger area chamber so that a higher fluid pressure is built up in the smaller diameter chamber. This pressure difference balances the forces exerted on both sides of the piston so as to eliminate any bias relative to the neutral position thereof of the steering wheel. This balance also balances the steering load both steering directions to ensure a good operating feel.

However, this conventional pressure control device tends to be mis-assembled due to the fact that the spool valves have essentially the same external diameter. Since the two spool valves have the same external diameter and are of generally the same size and shape except for the width of the groove, workers installing the spool valves in valve housings must pay careful attention to avoid mis-assembly. This obviously lowers efficiency. Furthermore, some instances of misassembly are inevitable. When the spool valves are installed in the valve housing backwards, the piston will generate a strong steering bias and so subject the vehicle occupants to serious danger.

SUMMARY OF THE INVENTION

Therefore, it is an object of the invention to provide a power-assist device for a vehicular steering system, which does not require much attention during assembling and thus makes assembly easier.

Another object of the invention is to provide a power-assist device for a vehicular steering system which can help make the overall steering system compact and light-weight.

A further object of the invention is to provide a power-assist device for a vehicle, which successfully and satisfactorily prevents the vehicular steering system from causing self-steering due to destroying of pressure balance in right-hand and left-hand steering around the neutral position.

In order to accomplish the aforementioned and other objects, a power-assist device for an automotive steering system according to the present invention employs spool valves with different external diameters to control the fluid pressure in smaller and larger area chambers of a pressure control valve which controls pressure in an unbalanced cylinder device. The different size of spool valves are disposed within different sizes of bores formed through a housing of the pressure control valve for defining wider fluid path area for introducing working fluid into the smaller area chamber so as to build up higher fluid pressure than that in the larger area chamber and narrower fluid path for draining the working fluid in the smaller area chamber for lower drainage rate in comparison with that for the larger area chamber.

According to one aspect of the invention, an automotive steering system having an unbalanced cylinder and a fluid control valve disposed in a hydraulic circuit connecting the cylinder to a fluid pressure source and to a fluid reservoir for controlling supply and drain of working fluid to the cylinder, comprises the unbalance cylinder having: an enclosed hollow cylinder, a piston disposed within the internal space of the cylinder so as to divide same into first and second working chambers, and a piston rod connected to the piston at one end and connected at the other end to a steering member which actuates re-alignment of vehicular wheels for steering, the piston rod extending through the first chamber and exiting the cylinder for connection to the steering member at the other end, the fluid control valve having a valve housing connected to a manually operable steering stub shaft by means of a yielding structural member, a first and a second bore passing through the valve housing, which first bore having larger internal diameter than that of said second bore, a first and second spool valve disposed reciprocably within the first and second bore respectively, the first and second spool valves being connected to the steering stub shaft so as to be driven reciprocably in response to relative displacement between the valve housing and the steering stub shaft due to yielding of the yielding member, and the first spool valve having the external diameter substantially corresponding to the internal diameter of said first bore, and said second spool valve having the external diameter substantially corresponding to the internal diameter of the second bore, first and second means defining a first supply orifice and a first drain orifice between the first spool valve and the inner periphery of the first bore, the flow cross-section of the first supply orifice varying with the position of the first spool valve for control of the supply of working fluid to the first working chamber in the cylinder, and the flow cross-section of the first drain control varying with the position of the first spool valve for control of drainage of working fluid from the second working chamber, and a second supply orifice and a second drain orifice between the second spool valve and the inner periphery of the second bore, the flow cross-section of the second supply orifice varying with the position of the second spool valve for control of the working fluid supply to the second working chamber of the cylinder, and the flow cross-section of the second drain orifice varying with the position of the second spool valve for control of drainage of working fluid from the first chamber of the cylinder, and the flow cross-section of the first supply orifice and the first drain orifice being greater than that of the corresponding second supply orifice and second drain orifice.

According to another aspect of the invention, a fluid flow control valve device for a power assist system for an automotive vehicle which has a hydraulically actuated unbalanced cylinder enclosing a piston connected to a steering member which actuates re-alignment of vehicular wheels for steering, which piston divides the unbalanced cylinder into first and second working chambers, comprises a valve housing connected to a manually operable steering stub shaft by means of a yielding structural member, a first and a second bore passing through the valve housing, which first bore having larger internal diameter than that of the second bore, a first and second spool valve disposed reciprocably within the first and second bore respectively, the first and second spool valves being connected to the steering stub shaft so as to be driven reciprocably in response to relative displacement between the valve housing and the steering stub shaft due to yielding of the yielding member, and the first spool valve having the external diameter substantially corresponding to the internal diameter of said first bore and said second spool valve having the external diameter substantially corresponding to the internal diameter of the second bore, first and second means defining a first supply orifice and a first drain orifice between the first spool valve and the inner periphery of the first bore, the flow cross-section of the first supply orifice varying with the position of the first spool valve for control of the supply of working fluid to the first working chamber in the cylinder, and the flow cross-section of the first drain control varying with the position of the first spool valve for control of drainage of working fluid from the second working chamber, and a second supply orifice and a second drain orifice between the second spool valve and the inner periphery of the second bore, the flow cross-section of the second supply orifice varying with the position of the second spool valve for control of the working fluid supply to the second working chamber of the cylinder, and the flow cross-section of the second drain orifice varying with the position of the second spool valve for control of drainage of working fluid from the first chamber of the cylinder, and the flow cross-section of the first supply orifice and the first drain orifice being greater than that of the corresponding second supply orifice and second drain orifice.

According to a further aspect of the invention an automotive steering system with a hydraulic power assist device comprises a steering member connected to vehicular wheels for adjusting the orientation of the wheels for steering and transversely movable according to manual steering adjustments, a hollow hydraulic cylinder having first and second inlet ports and first and second drain ports, a piston disposed within the hydraulic cylinder and dividing the internal space of the cylinder into first and second chambers, the first chamber being in communication with the first inlet port and the first drain port, and the second chamber being in communication with the second inlet port and the second drain port, the piston being connected to the steering member for transverse movement therewith via a piston rod extending through the first chamber, a power-assist valve housing with a third inlet port connected to a working fluid source, first and second outlet ports respectively connected to the first and second inlet ports of the cylinder, and third and fourth drain ports respectively connected to the first and second drain ports of the cylinder and a fifth drain port connected to a fluid reservoir for returning working fluid thereto, the housing also having first and second bores passing therethrough, the first bore having greater internal diameter than that of the second bore, the first bore being in communication with the first outlet port and the fourth drain port and the second bore being in communication with the second outlet port and the third drain port, first and a second spool valves respectively disposed within the first and second bores and associated with a steering shaft rotatable manually in opposite directions, the first spool valve having an external diameter substantially comforming with the first bore and the second spool valve having an external diameter substantially comforming with the second bore, the first spool valve defining a first variable supply control path in conjunction with the inner periphery of the first bore establishing fluid communication between the third inlet port and the first outlet port, and a variable first drain control path in conjunction with the inner periphery of the first bore establishing fluid communication between the fifth drain port and the third drain port, and the second spool valve defining in conjunction with the inner periphery of the second bore a second supply control path establishing fluid communication between the third inlet port and the second outlet port and a second drain path establishing fluid communication between the fifth drain port and the fourth drain port, the second control paths having smaller flow cross-section than the first control paths, the flow cross-sections of all of the control paths varying with rotation of the steering shaft.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment of the invention but are for explanation and understanding only.

In the drawings.

DESCRIPTION OF THE PREFERRED EMBODIMENT

Figure 1:
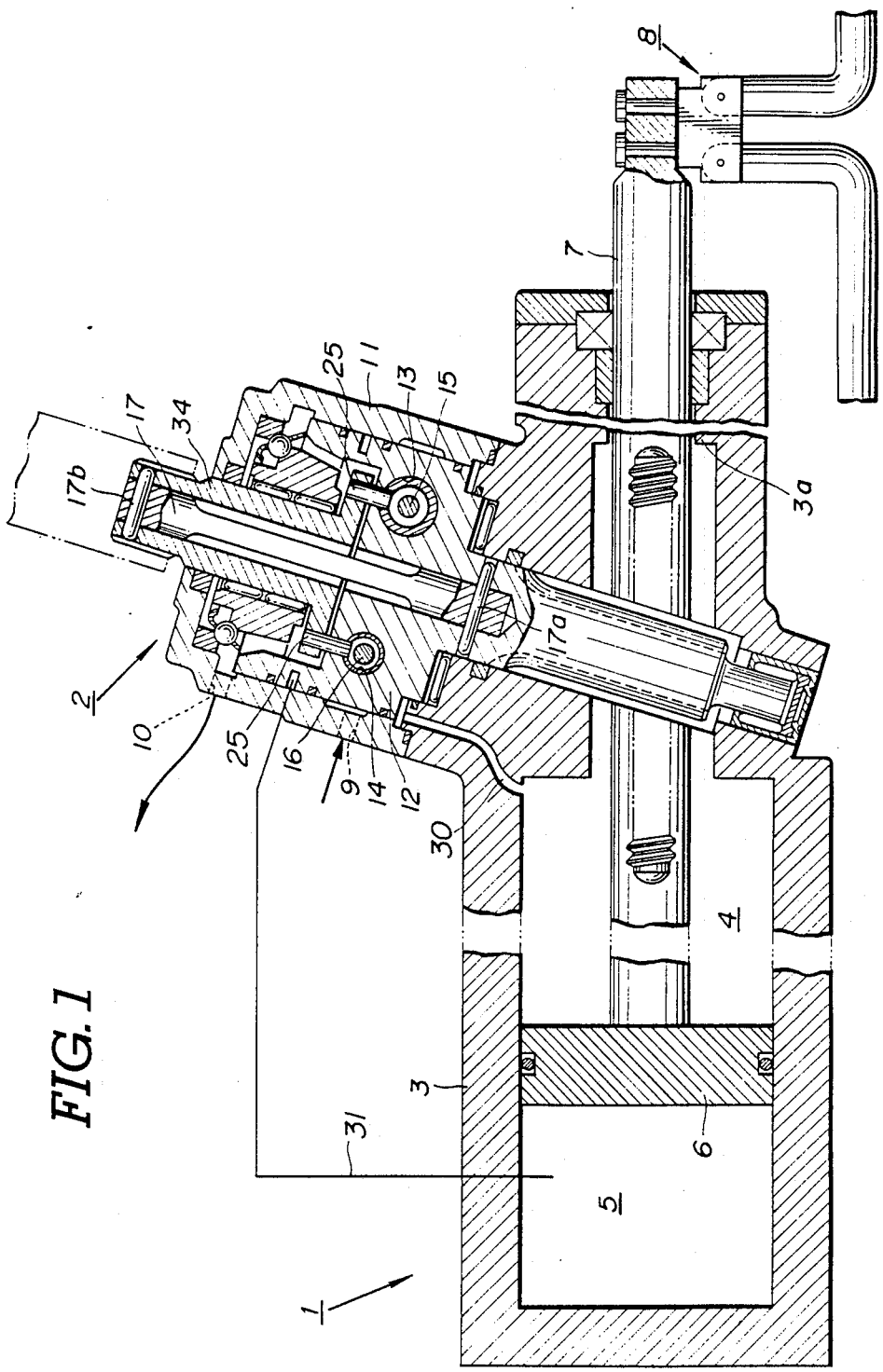
FIG. 1 is a section through the pressure control device used in the preferred embodiment of the power-assist device according to the present invention.
Figure 2:
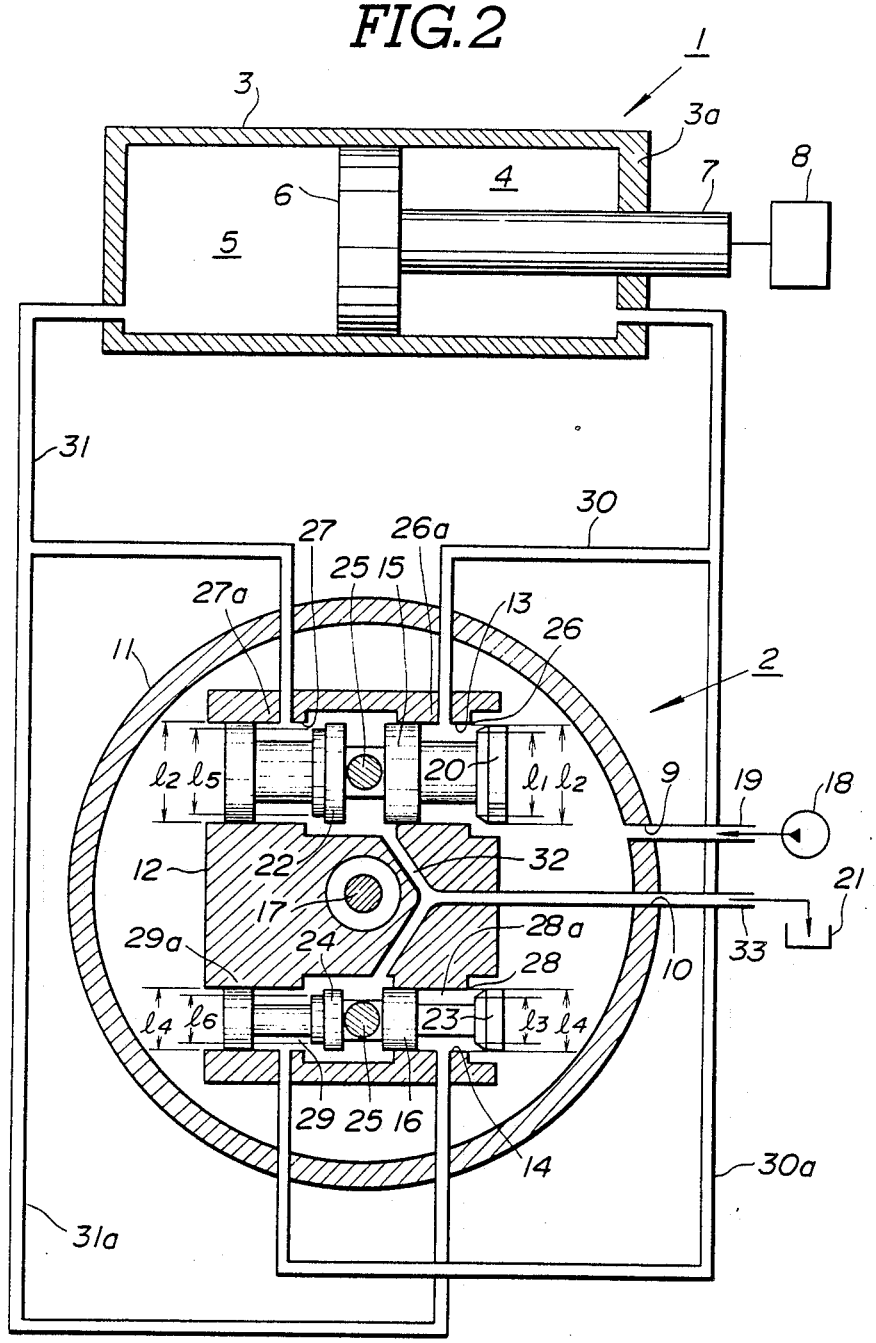
FIG. 2 is a diagram of the preferred embodiment of a power-assist device for an automotive steering system, in which the pressure control device is sectioned taken along line II—II of FIG. 1.

Referring now to the drawings, particularly to FIGS. 1 and 2, the preferred embodiment of a power-assist device according to the present invention generally comprises an unbalanced cylinder device 1 and a hydraulic pressure control device 2.

The unbalanced cylinder device 1 has an enclosed hollow cylinder 3. A piston 6 is slidingly disposed within the internal space of the cylinder 3 and defines therein a smaller area chamber 4 and a larger area chamber 5. The piston 6 is fixedly mounted to one end of a piston rod 7. The piston rod 7 extends through the smaller area chamber 4 and 1 through an opening in a cylinder end wall 3a. The opening in the cylinder wall 3a for the piston rod 7 is sealed fluid-tight. The outer end of the piston rod 7 is connected to a steering member 8, i.e. a tie-rod, so as to transmit steering force of the piston 6 to the steering member 8.

The hydraulic pressure control valve 2 is disposed within a hydraulic circuit connecting a working fluid source 18, which comprises a fluid pump, and the unbalanced cylinder device 1. The hydraulic pressure control device 2 has a housing 11. The housing 11 has an inlet port 9 and a drain port 10. A valve body 12 is disposed within the housing 11. As shown in FIG. 1, the valve body 12 is connected to the steering member 8 through the piston rod 7. In the shown embodiment, the interconnection between the piston rod 7 and the lower end of the valve body 12 constitutes a well-known rack-and-pinion steering mechanism.

The valve body 12 is also connected to a steering stub shaft 34 which is manually operable through a steering wheel (not shown), by means of a torsion bar 17. Each end of the torsion bar 17 is fixed to the valve body 12 and the steering stub shaft 34 by means of connector pins 17a and 17b. First and second bores 13 and 14 pass through the valve body 12 perpendicular to and to either side of the torsion bar 17 which lies essentially parallel to the axis of the valve body. First and second spool valves 15 and 16 are accommodated within the first and second bores 13 and 14 so as to be free to reciprocate along the axes of the first and second bores. The first and second spool valves 15 and 16 are both connected to the steering stub shaft 34 by means of finger pins 25 fixed to the steering stub shaft at one end.

When the valve body 12 receives steering counter force force transmitted from vehicular wheels through the steering member 8 or when the steering stub shaft 34 is rotated for steering adjustment, the torsion bar 17 is stressed torsionally, resulting in an angular displacement relative to the steering stub shaft. This is reflected in a corresponding angular displacement between the first and second bores 13 and 14 of the valve body 12 and the first and second spool valves 15 and 16. As apparent, the first and second spool valves 15 and 16 are displaced in opposite directions.

The first bore 13 is in communication with the smaller and larger area chambers 4 and 5 via ports formed through the valve body 12 and pressure lines 30 and 31. The second bore 14 is also in communication with the smaller and larger area chambers 4 and 5 via ports formed through the valve body and via the pressure lines 30a and 31a. Both of the first and second bores 13 and 14 are also connected to a working fluid reservoir 21 via drain passages 32 defined in the valve body, drain port 10 and the return passage 33

The first spool valve 15 has a supply control land 20 for controlling flow rate of the working fluid into one end of the first bore 13 and thereby controlling the supply of working fluid from the first bore 13 to the smaller area chamber 4 and a drain control land 22 for controlling the rate of flow of working fluid from the larger area chamber 5 to the opposite end of the first bore 13. As apparent from FIG. 2, the opposite end of the first bore 13 is in communication with the drain passage 32 for draining the working fluid in the larger area chamber 5 to the reservoir 21 via the drain passage 32, the drain port 10 and the return passage 33. Similarly, the second spool valve 16 is provided with a supply control land 23 for controlling the rate of flow of working fluid to one end of the second bore 14 and thus controlling the working fluid supply to the larger area chamber 5. The second spool valve 16 is further provided with a drain control land 24 for controlling the rate of flow of working fluid from the smaller area chamber 4 to the other end of the second bore 14. The other end of the second bore 14 is connected to the reservoir 21 via the drain passage 32, the port 10 and the return passage 33.

The supply control land 20 opposes a land 26a projecting into the first bore 13 to form a supply control throttling orifice 26. The drain control land 22 similarly cooperates with a land 27a to form drain control throttling orifice 27. Similarly, the supply control land 23 works in conjunction with a land 28a around the inner periphery of the second bore 14 to form another supply control throttling orifice 28. The drain control land 24 cooperates with a land 29a in the second bore 14 to form a second drain control throttling orifice 29.

The first bore 13 has an internal diameter $l_2$ which is substantially greater than an internal diameter $l_4$ of the second bore 14. The lands 20 and 22 of the first spool valve 15 have larger diameter section having the diameter $l_2$ substantially correspond to the internal diameter of the first bore. The lands 20 and 22 of the first spool valve 15 have smaller diameter section having the diameters $l_1$ and $l_5$ for defining the supply control throttling orifice 26 with the land 26a and the drain control throttling orifice 27 with the land 27a. Similarly, the lands 23 and 24 have larger diameter sections having the diameter substantilly corresponding to the internal diameter $l_4$ second bore 14. The lands 23 and 24 have smaller diameter section having the diameters $l_3$ and $l_6$ for defining the supply control throttling orifice 28 with the land 28a and the drain control throttling orifice 29 with the land 29a. Therefore, the supply control throttling orifice 26 of the first bore 13 exerts less resistance to fluid flow into the smaller diameter area chamber 4 than the supply control throttling orifice 28 of the second bore 14. Similarly, the drain control throttling orifice 27 exerts less resistance to fluid flow than the drain control throttling orifice 29 of the second bore 15. This, in turn, means smaller resistance is exerted for introducing working fluid into the smaller area chamber 4 through the supply control throttling orifice 26 in comparison with the resistance exerted for introducing working fluid into the larger area chamber 5 through the supply control throttling orifice 28, and larger resistance is exerted for draining the working fluid in the smaller area chamber 4 through the drain control throttling orifice 29 in comparison with the resistance exerted for draining the working fluid in the larger diameter area chamber 5 through the drain control throttling orifice 27.

It should be noted that the difference between the diameters of the first and second bores 13 and 14 and the first and second spool valves 15 and 16 is selected to compensate for the hydraulic force differential between the smaller area chamber 4 and the larger area chamber 5. Therefore, the difference in flow cross-section between the sets of throttling orifices 26, 27 and 28, 29 is inversely proportional to the difference between the effective area of the piston 6.

The operation of the preferred embodiment of the power assist device according to the invention will be described herebelow.

When the steering system is in its neutral position, the first and second spool valves 15 and 16 lie in their respective neutral positions as shown in FIG. 2. At the neutral positions of the first and second spool valves 15 and 16, the flow cross-section differential between the supply control throttling orifices 26 and 28 is just enough to compensate for the difference between the effective areas of the smaller and larger area chambers 4 and 5. In addition, the drain control throttling orifice 27 connected to the larger chamber 5 has a larger flow cross-section than the drain control throttling orifice 29 connected to the smaller chamber 4. This establishes a balance between the hydraulic forces exerted on opposite sides of the piston 6 so as to hold the piston in its neutral position. As a result, directional bias in the steering system due to the difference between the effective areas of the smaller area chamber 4 and the larger area chamber 5 can be successfully and satisfactorily prevented.

When the steering wheel is turned for a right-hand steering adjustment, causing clockwise rotation of the steering stub shaft 34, the first spool valve 15 shifts to the right through the first bore 13 to an extent corresponding to the steering adjustment magnitude. At the same time, the second spool valve 16 shifts to the left through the second bore 14 to an extent corresponding to the steering adjustment magnitude. As a result, the flow cross-sections of the supply control throttling orifice 26 and of the drain control throttling orifice 27 gradually increase according to rightward movement of the first spool valve 15, and conversely, the supply control throttling orifice 28 and the drain control throttling orifice 29 becomes more constricted as the second spool valve 16 moves to the left. Thus, the smaller area chamber 4 receives a greater supply of the working fluid due to the increase in the flow cross-section of the supply control throttling orifice 26. This increase in the fluid pressure in the smaller area chamber 4 is augmented by a decrease in the flow cross-section of the drain control throttling orifice 29 of the second bore 14, which is also in communication with the smaller area chamber 4. On the other hand, the larger area chamber 5 receives a reduced supply of working fluid due to the decrease in the flow cross-section of the supply control throttling orifice 28. In addition, the larger area chamber 5 loses more working fluid through the increased flow cross-section of the drain control throttling orifice 27 of the first bore. Therefore, the fluid pressure in the smaller chamber 4 exceeds that in the larger area chamber 5, resulting in leftward movement of the piston 6, reflected in a rightward toe change of the vehicular wheel. The stroke of the piston 6 corresponds to the fluid force differential between the smaller area chamber and the larger area chamber. The fluid force differential between the smaller and larger area chambers 4 and 5 drops as the piston 6 shifts toward the larger area chamber 5 until the fluid forces balance at the piston position corresponding to the magnitude of the steering adjustment.

When the steering is adjusted to the left, resulting in counterclockwise rotation of the steering stub shaft 34, the first spool valve 15 shifts to the left to an extent corresponding to the steering adjustment. At the same time, the second spool valve 16 shifts to the right to an extent corresponding to the steering adjustment. As a result, the flow cross-section of the supply control throttling orifice 26 and of the drain control throttling orifice 27 of the first bore 13 gradually drops according to the leftward movement of the first spool valve 15. Conversely, the supply control throttling orifice 28 and the drain control throttling orifice 29 increase in flow cross-section as the second spool valve 16 moves to the right. The smaller area chamber 4 thus receives a smaller supply of working fluid due to the decrease in the flow cross-section of the supply control throttling orifice 26. This drop in the fluid pressure in the smaller chamber 4 is augmented by the increase in the flow cross-section of the drain control throttling orifice 29 of the second bore 14, which is in communication with the smaller area chamber 4. Conversely, the larger area chamber 5 receives an increased supply of working fluid as the flow cross-section of the supply control throttling orifice 28 increases, and, larger area chamber 5 loses less working fluid through the decreased flow cross-section of the drain control throttling orifice 27 of the first bore. Therefore, the fluid pressure in the larger chamber 5 exceeds that of the smaller area chamber 4 resulting in rightward movement of the piston 6 which is reflected in a leftward toe change of the vehicular wheel. The stroke of the piston 6 corresponds to the fluid force differential between the smaller area chamber and the larger area chamber. The fluid force differential between the smaller and larger area chambers 4 and 5 drops as the piston 6 shifts toward the smaller area chamber 4 until these forces balance at the piston position corresponding to the magnitude of the steering adjustment.

Figure 3:
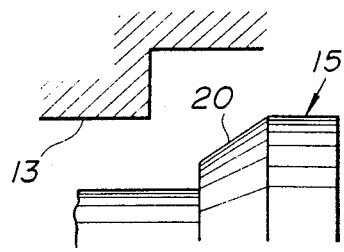
FIG. 3 is an enlarged side elevation of the major part of the pressure control device of FIG. 2.
Figure 4:
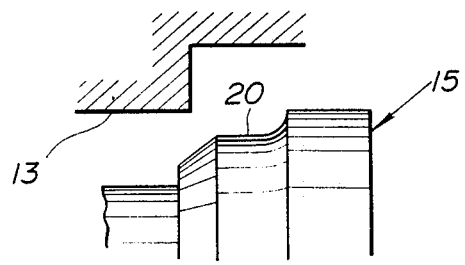
FIGS. 4 and 5 are view similar to FIG. 3 but showing modifications of the construction of the pressure control device.
Figure 5:
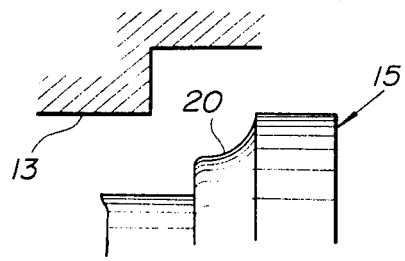

As shown in FIG. 3, the land 20 of the first spool valve 15 has tapered intermediate section formed between the larger diameter section and the smaller diameter section, which intermediate section linearly reduces the diameter toward the smaller diameter section. FIGS. 4 and 5 are modification of the profile of the intermediate section. Both of the modifications are provided with curved peripheral surfaces. These curves determine characteristics of throttling rate variation depending of the stroke of the first spool valve in non-linear fashion. Such intermediate section with any desired curve profile would be applicable for the land 20 to desired throttling characteristics of, the supply control throttling orifice 20. Similarly, the intermediate section between the smaller diameter section and larger diameter section of the land 23 may have variaous pperipheral profile according to throttling characteristics required. Furthermore, though the shown embodiment have lands 22 and 24 having stepped smaller diameter sections and larger diameter sections, these lands may also have the intermediate sections with variaous peripheral profile selected according to the required throttling characteristics.

According the shown embodiment, since the first and second spool valves 15 and 16 have substantially different diameter, it is impossible to erroneously assemble the hydraulic pressure control valve. This also allows quicker and more efficient assembly.

In addition, given the above structure, it is unnecessary to mark the spool valves for assembly during production. This reduces the number of steps needed for spool valve production and so lowers the production cost.

Therefore, the present invention fulfills all of the objects and advantages sought therefor.

While the invention has been disclosed hereabove in terms of the preferred embodiment of the invention for the sake of disclosure, the invention should not be understood to be limited to the specific embodiment. It should be appreciated that the invention includes all possible embodiments and modifications of the shown embodiment which do not depart from the principles set out in the appended claims.

What is claimed is:

1. An automotive steering system having an unbalanced cylinder and a fluid control valve disposed in a hydraulic circuit connecting said cylinder to a fluid pressure source and to a fluid reservoir for controlling supply and drain of working fluid to said cylinder, comprising:

said unbalanced cylinder having:
an enclosed hollow cylinder;
a piston disposed within the internal space of said cylinder so as to divide same into first and second working chambers; and
a piston rod connected to said piston at one end and connected at the other end to a steering member which actuates re-alignment of vehicular wheels for steering, said piston rod extending through said first chamber and exiting said cylinder for connection to said steering member at said other end;

said fluid control valve having:
a valve housing connected to a manually operable steering stub shaft by means of a yielding structural member;
first and second bores passing through a valve body, said first and second bores having axes extending substantially parallel to each other and substantially perpendicular to said steering stub shaft and having one end communicating with a pressurized fluid chamber, said first bore having a larger internal diameter than that of said second bore;
first and second spool valves disposed reciprocably within said first and second bores respectively, said first and second spool valves being connected to said steering stub shaft so as to be driven reciprocably in response to relative displacement between said valve housing and said steering stub shaft due to yielding of said yielding member, and said first spool valve having first, second, third and fourth lands respectively having an external diameter substantially corresponding to the internal diameter of said first bore for defining between said first and second lands a first working chamber communicating with said first chamber of said cylinder via a first port, between said second and third lands a third drain chamber communicating with a first drain line, said second spool valve having fifth, sixth, seventh and eighth lands having an external diameter substantially corresponding to the internal diameter of the second bore for defining between said fifth and sixth lands a fourth working chamber communicating with said second chamber of said cylinder via a fourth port, between said seventh and eighth lands a fifth working chamber communicating with said first chamber via a fifth port, and between said sixth and seventh lands a sixth drain chamber communicating with a second drain line, said first and fourth working chambers being in communication with said pressurized fluid chamber, and said second and fifth working chambers being in communication with said third and sixth drain chamber;

first means defining a first supply orifice for establishing and blocking fluid communication between said first working chamber and said pressurized fluid chamber and a first drain orifice for establishing and blocking fluid communication between said second working chamber and said third drain chamber, between said first spool valve and the inner periphery of said first bore, the flow cross-section of said first supply orifice varying with the position of the first spool valve for control of the supply of working fluid to said first working chamber in said cylinder, and the flow cross-section of said first drain orifice varying with the position of said first spool valve for control of drainage of working fluid from said second working chamber; and second means for defining a second supply orifice for establishing and blocking fluid communication between said fourth working chamber and said pressurized fluid chamber and a second drain orifice for establishing and blocking fluid communication between said fifth working chamber and said drain chamber, between said second spool valve and the inner periphery of said second bore, the flow cross-section of said second supply orifice varying with the position of said second spool valve for control of the working fluid supply to said second working chamber of said cylinder, and the flow cross-section of said second drain orifice varying with the position of said second spool valve for control of drainage of working fluid from said first chamber of said cylinder, and said flow cross-section of said first supply orifice and said first drain orifice being greater than that of the corresponding second supply orifice and second drain orifice.

2. The steering system as set forth in claim 1, wherein said first means comprises said first and third lands on said first spool valve and ninth and tenth lands on the inner periphery of said first bore, said first land opposing said ninth land so as to define said first supply orifice therebetween and said third land opposing said tenth land so as to define therebetween said first drain orifice, and said second means comprises said fifth and seventh lands on said second spool valve and eleventh and twelfth lands on the inner periphery of said second bore, said fifth land opposing said eleventh land so as to define said second supply orifice therebetween and said seventh land opposing said twelfth land so as to define said second drain orifice therebetween.

3. The steering system as set forth in claim 2, wherein the flow cross-sections of said first supply orifice and said first drain orifice are larger than those of said second supply orifice and said second drain orifice to such an extent that the increase in fluid flow rate through said first supply orifice to said first bore relative to that through said second supply orifice to said second working chamber, and the decrease in fluid flow rate through said second drain orifice from said first chamber relative to that through said first drain orifice from said second working chamber compensate for the difference between the effective areas of said first and second working chambers due to the presence of said piston rod.

4. The steering system as set forth in claim 3, wherein said ninth and tenth lands are larger in diameter than said first and third lands so as to define said first supply orifice and said first drain orifice, and said eleventh and twelfth lands are larger in diameter than said fifth and seventh lands so as to define said second supply orifice and said second drain orifice, said ninth and tenth lands being of greater diameter than said eleventh and twelfth lands.

5. A fluid flow control valve device for a power assist system for an automotive vehicle which has a hydraulically actuated unbalanced cylinder enclosing a piston connected to a steering member which actuates realignment of vehicular wheels for steering, which piston divides the internal space of the cylinder into first and second working chambers, comprising:

a valve housing defining an internal space, in which a valve body is reciprocably disposed, said valve body being connected to a manually operable steering stub shaft by means of a yielding structural member, said valve housing being connected to a hydraulic pressure source for introducing pressurized working fluid into a pressurized fluid chamber defined around said valve body;

first and second bores passing through said valve body, said first and second bores having axes extending substantially parallel to each other and substantially perpendicular to said steering stub shaft and having one end communicating with said pressurized fluid chamber, said first bore having a larger internal diameter than that of said second bore;

first and second spool valves disposed reciprocably within said first and second bores respectively, said first and second spool valves being connected to said steering stub shaft so as to be driven reciprocably in response to relative displacement between said valve housing and said steering stub shaft due to yielding of said yielding member, and said first spool valve having first, second, third and fourth lands respectively having an external diameter substantially corresponding to the internal diameter of said first bore for defining between said first and second lands a first working chamber communicating with said first chamber of said cylinder via a first port, between said third and fourth lands a second working chamber communicating with said second chamber via a second port, and between said second and third lands a third drain chamber communicating with a first drain line, said second spool valve having fifth, sixth, seventh and eighth lands having an external diameter substantially corresponding to the internal diameter of the second bore for defining between said firth and sixth lands a fourth working chamber communicating with said second chamber of said cylinder via a fourth port, between said seventh and eighth lands a fifth working chamber communicating with said first chamber via a fifth port, and between said sixth and seventh lands a sixth drain chamber communicating with a second drain line, said first and fourth working chamber being in communication with said pressurized fluid chamber, and said second and firth working chambers being in communication with said third and sixth drain chamber;

first means defining a first supply orifice for establishing and blocking fluid communication between said first working chamber and said pressurized fluid chamber and a first drain orifice for establishing and blocking fluid communication between said second working chamber and said third drain chamber, between said first spool valve and the inner periphery of said first bore, the flow cross-section of said first supply orifice varying with the position of the first spool valve for control of the supply of working fluid to said first working chamber in said cylinder, and the flow cross-section of said first drain orifice varying with the position of said first spool valve for control of drainage of working fluid from said second working chamber; and second means for defining a second supply orifice for establishing and blocking fluid communication between said fourth working chamber and said pressurized fluid chamber and a second drain orifice for establishing and blocking fluid communication between said fifth working chamber and said drain chamber, between said second spool valve and the inner periphery of said second bore, the flow cross-section of said second supply orifice varying with the position of said second spool valve for control of the working fluid supply to said second working chamber of said cylinder, and the flow cross-section of said second drain orifice varying with the position of said second spool valve for control of drainage of working fluid from said first chamber of said cylinder, and said flow cross-section of said first supply orifice and said first drain orifice being greater than that of the corresponding second supply orifice and second drain orifice.

6. The fluid flow control valve as set forth in claim 5, wherein said first means comprises said first and second lands on said spool valve and ninth and tenth lands on the inner periphery of said first bore, said first land opposing said ninth land so as to define said first supply orifice therebetween and said second land opposing said tenth land so as to define therebetween said first drain orifice, and said second means comprises said fifth and seventh lands on said second spool valve and eleventh and twelfth lands on the inner periphery of said second bore, said fifth land opposing said eleventh land so as to define said second supply orifice therebetween and said seventh land opposing said twelfth land so as to define said second drain orifice therebetween.

7. The fluid flow control valve as set forth in claim 6, wherein the flow cross-sections of said first supply orifice and said first drain orifice are larger than those of said second supply orifice and said second drain orifice to such an extent that the increase in fluid flow rate through said first supply orifice to said first bore relative to that through said second supply control section to said second working chamber, and the decrease in fluid flow rate though said second drain orifice from said first chamber relative to that through said first drain orifice from said second working chamber compensate for the difference between the effective areas of said first and second working chambers due to the presence of said piston rod.

8. The fluid flow control valve as set forth in claim 7, wherein said ninth and tenth lands are larger in diameter than said first and third lands so as to define said first supply orifice and said first drain orifice, and said eleventh and twelfth lands are larger in diameter than said fifth and seventh lands so as to define said second supply orifice and said second drain orifice, said ninth and tenth lands being of greater diameter than said eleventh and twelfth lands.

9. An automotive steering system with a hydraulic power assist device comprising:
 a steering member connected to vehicular wheels for adjusting the orientation of the wheels for steering and transversely movable according to manual steering adjustments;
 a hollow hydraulic cylinder having first and second ports;
 a piston disposed within said hydraulic cylinder and dividing the internal space of said cylinder into first and second chambers, said first chamber being in communication with said first port, and said second chamber being in communication with said second port, said piston being connected to said steering member for transverse movement therewith via a piston rod extending through said first chamber;
 a power-assist valve housing with a first inlet port connected to a working fluid source, first and second outlet ports respectively connected to said first and second ports of said cylinder, and first and second drain ports respectively connected to said first and second ports of said cylinder and a third drain port connected to a fluid reservoir for returning working fluid thereto, said housing also having first and second bores passing therethrough, said first bore having a greater internal diameter than that of said second bore, said first bore being in communication with said first outlet port and said second drain port and said second bore being in communication with said second outlet port and said first drain port;
 first and second spool valves respectively disposed within said first and second bores and associated with a steering shaft rotatable manually in opposite directions, said first spool valve having a plurality of lands having an external diameter substantially conforming with said first bore for defining a first supply chamber and a first drain chamber in said first bore, said first supply chamber being in communication with said first inlet port and in communication with said first port of said cylinder, said first drain chamber being in communication with said third drain port and in communication with said second port of said cylinder, and said second spool valve having a plurality of lands having an external diameter substantially conforming with the second bore for defining a second supply chamber and a second drain chamber within said second bore, said second supply chamber being in communication with said first inlet port and in communication with said second port of said cylinder, said second drain chamber being in communication with said third drain port and in communication with said first port of said cylinder, said first spool valve being movable along the axis of said first bore and defining a first variable supply control path between said first supply chamber and said first outlet port of said valve housing in conjunction with the inner periphery of said first bore establishing and blocking fluid communication between said first supply chamber and said first cylinder port via said first outlet port, and a variable first drain control path between said first drain chamber and said second drain port of said valve housing in conjunction with said inner periphery of said first bore establishing and blocking fluid communication between said third drain port and said first drain chamber via said second drain port, and said second spool valve being movable along the axis of said second bore and defining in conjunction with the inner periphery of said second bore a second supply control path between said second supply chamber and said second outlet port of said valve housing for establishing and blocking fluid communication between said second port and said second supply chamber via said second outlet port and a second drain path between said second drain chamber and said third drain port for establishing and blocking fluid communication between said third drain port and said first outlet port, said second control paths having smaller flow cross-section than said first control paths, the flow cross-sections of all of said control paths varying with rotation of said steering shaft.

* * * * *

UNITED STATES PATENT AND TRADEMARK OFFICE
CERTIFICATE OF CORRECTION

PATENT NO. : 4,953,416
DATED : September 4, 1990
INVENTOR(S) : Koichi Komatsu

It is certified that error appears in the above-identified patent and that said Letters Patent is hereby corrected as shown below:

In column 1, line 57, delete "feel" and insert --feeling--.

In column 6, line 49, after "1$_4$" insert --of the --.

In column 9, claim 1, line 63, after "said" insert --third and fourth lands a second working chamber communicating with said second chamber via a second port, and between said--.

In column 12, claim 5, line 5, delete "firth" and insert --fifth--.

In column 12, claim 6, line 67, delete "though" and insert --through--.

Signed and Sealed this

Twenty-first Day of April, 1992

Attest:

HARRY F. MANBECK, JR.

*Attesting Officer*     *Commissioner of Patents and Trademarks*